United States Patent [19]

Winyall

[11] Patent Number: 4,508,607
[45] Date of Patent: Apr. 2, 1985

[54] PARTICULATE DIALYTIC SILICA

[75] Inventor: Milton E. Winyall, Columbia, Md.

[73] Assignee: W. R. Grace & Co., New York, N.Y.

[21] Appl. No.: 533,206

[22] Filed: Sep. 20, 1983

Related U.S. Application Data

[63] Continuation-in-part of Ser. No. 434,764, Oct. 18, 1982, abandoned.

[51] Int. Cl.[3] .................... B01D 57/02; C25B 1/00
[52] U.S. Cl. .................... 204/180 P; 204/101; 423/335; 423/338; 423/339
[58] Field of Search .................... 204/101, 180 P; 423/335, 338, 339

[56] References Cited

U.S. PATENT DOCUMENTS

| | | | |
|---|---|---|---|
| 3,668,088 | 6/1972 | Iler | 204/101 |
| 3,954,944 | 5/1976 | Aldcroft | 423/339 |
| 4,124,471 | 11/1978 | Lieb et al. | 204/101 |
| 4,147,605 | 4/1979 | Schenker | 204/101 |
| 4,193,851 | 3/1980 | Crawford | 423/339 |
| 4,273,509 | 6/1981 | Wasan | 423/339 |
| 4,279,879 | 7/1981 | Winyall et al. | 204/101 |

Primary Examiner—John F. Niebling
Attorney, Agent, or Firm—Arthur P. Savage

[57] ABSTRACT

Finely divided particulate silica is prepared by the electrodialysis of sodium silicate solution in the presence of silica-containing nucleation particles (seeds). The novel particulate silica product, herein referred to as dialytic silica, may be used in the preparation of catalysts, sorbents, abrasives, fillers and thickeners.

15 Claims, 6 Drawing Figures

PARTICULATE DIALYTIC SILICA

This application is a continuation-in-part of U.S. Ser. No. 434,764 filed Oct. 18, 1982, now abandoned.

The present invention relates to the preparation of novel finely divided particulate silicas, and more specifically to the manufacture of novel precipitated silicas, herein frequently referred to as "dialytic silicas", which are obtained by the electrodialysis of sodium silicate solutions and that have a particulate size range similar to that of conventional precipitated silicas.

Precipitated silica is generally prepared by reacting an alkali metal silicate such as sodium silicate and an inorganic acid under conditions that promote the formation of individual silica particles suspended in a continuous aqueous phase. In contrast, silica gel is prepared under conditions wherein a continuous silica mass is formed in which water is trapped, and the water phase is continuous.

Precipitated silica distinguishes over colliodal silica, in that the particle size of dried precipitated silica is considerably larger, that is, 5 to 50 millimicrons for silica sols versus from about 0.5 to 50 microns for precipitated silica.

The prior art discloses several procedures for the preparation of both silica gel and silica sols by the elctrolysis/electrodialysis of sodium silicate solutions.

British No. 816,581 discloses methods for preparing silica sols wherein sodium silicate is subjected to electrolysis or electrodialysis either batch-wise or continuously in either a single electrolytic-electrodialysis cell or in a series of cells.

U.S. Pat. No. 3,668,088 describes a process for preparing colloidal silica by the electrolysis of sodium silicate in the presence of a supplemental electrolyte such as sodium chloride.

U.S. Pat. Nos. 4,124,471, 4,147,605 and 4,203,822 describe electrolytic procedures for preparing sols which have controlled particle size wherein silica or metal oxide seeds (typically silica sols) are included in the anolyte solution during start-up of the process.

French No. 968,361 and U.S. Pat. No. 1,557,491 describe methods for preparing silicic acid solutions by the electrolysis of sodium silicate under conditions which prevent precipitation of silica.

U.S. Pat. No. 4,193,851 describes a method for preparing silica gel by the electrolysis of sodium silicate under the conditions wherein silica gel collects upon the anode of an electrolytic cell.

U.S. Pat. No. 4,279,879 describes a method for preparing silica gel wherein sodium silicate solution which contains a salt such as sodium nitrate or sodium sulfate is subjected to electrodialysis.

While the above noted prior art describes methods for preparing both silica gel and silica sols by the electrolysis or electrodialysis of sodium silicate solutions, methods for the preparation of commercial quantities of particulate silicas having the particle size of precipitated silica by the electrodialysis of sodium silicate have not been developed.

It is therefore an object to provide novel particulate silica products (dialytic silicas) which may be obtained by the electrodialysis of alkali metal silicate solutions.

It is an additional object to provide a method for preparing novel dialytic silicas which have a particle size range similar to that of conventional precipitated silica.

It is another object to provide a method by which dialytic silica may be economically and efficiently prepared on a commercial scale by the electrodialysis of sodium silicate solutions.

It is a further object to provide particulate dialytic silicas having desirable physical characteristics and which contain a minimum quantity of alkali metal residues.

It is a further object to provide a method for preparing commercial quantities of dialytic silica wherein the production of waste effluents is minimized or eliminated.

These and still further objects of the present invention will become readily apparent from the following detailed description and drawing wherein.

Figure 3:
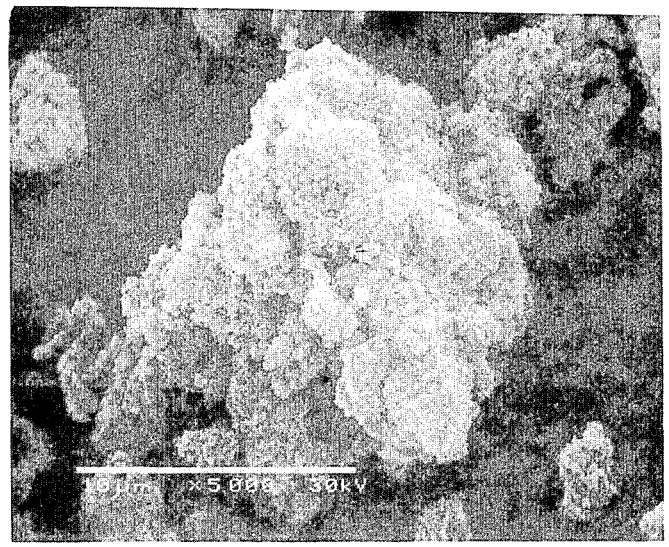
Figure 4:
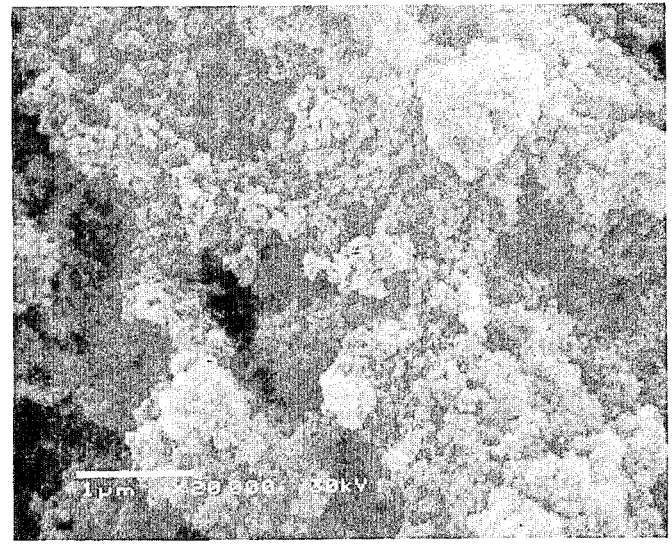
Figure 5:
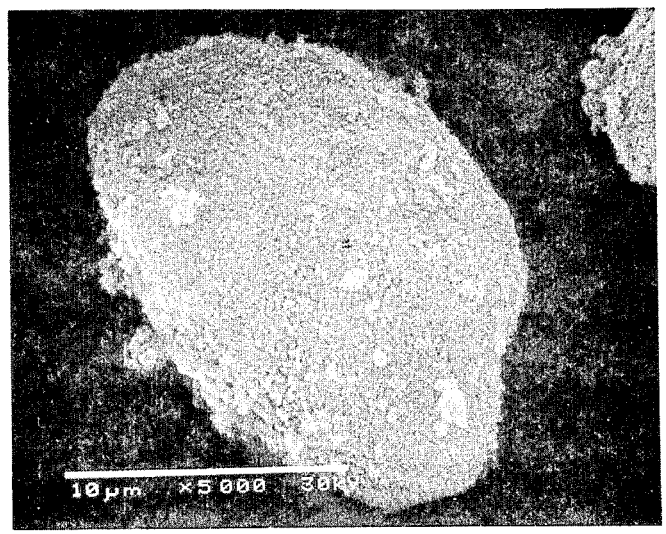
Figure 6:
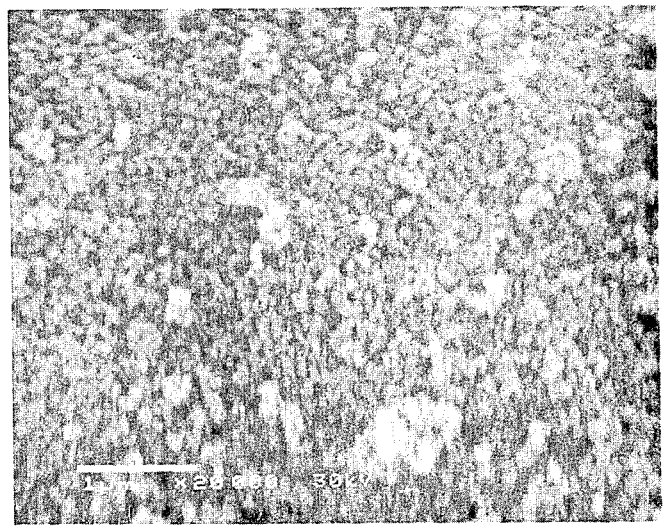

FIGS. 3 and 4 are electron photomicrographs of the novel dialytic silica product of the present invention taken at 5000× and 20,000× magnification, respectively; and FIGS. 5 and 6 are electron photomicrographs of a conventional precipitated silica product obtained by the reaction of sodium silicate with acid taken at 5000× and 20,000× magnification, respectively.

Broadly, my invention contemplates the production of novel particulate silicas, i.e. dialytic silicas, by the electrodialysis of an alkali metal silicate/salt solution in the presence of finely divided (colloidal) silica seeds.

More specifically, I have found that useful, dialytic silicas having a particle size range similar to that of conventional precipitated silica may be economically prepared by the electrodialysis of an aqueous anolyte which contains an alkali metal silicate, preferably sodium silicate, an electroconductive salt, preferably sodium sulfate or sodium nitrate, and finely divided seeds, preferably silica, or silica-alumina. In a particularly preferred embodiment of the invention, the electrodialysis process is conducted on a continuous basis in a series of electrodialysis cells, and a catholyte is recovered which contains sodium hydroxide solution that may be either recycled or used in the preparation of additional sodium silicate, while dialytic silica is continuously precipitated and recovered from the anolyte.

Figure 1:
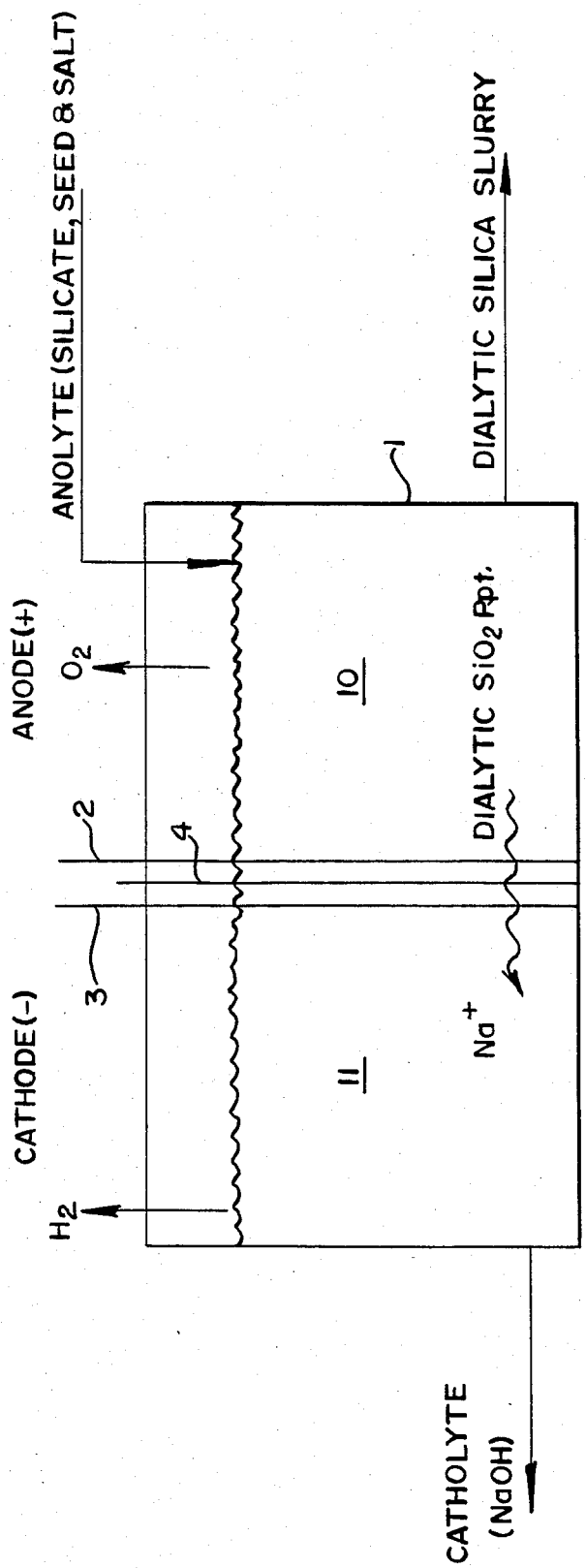
FIG. 1 is a cross-sectional view of an electrodialysis cell which may be used in the practice of the invention.

A more clear understanding of the present invention may be obtained by reference to the drawing, wherein FIG. 1 is a cross-sectional view of an electrodialysis cell that may be used in the practice of the present invention. As shown in FIG. 1, the cell comprises a container 1, in which is placed an anode 2, and a cathode 3. Separating the anode and cathode is a cation permaselective membrane 4. The membrane 4 also separates anode compartment 10 from cathode compartment 11.

In operation of the cell shown in FIG. 1, an anolyte which typically comprises sodium silicate solution, colloidal silica (seeds) and sodium sulfate is added to the anode compartment 10. The initial anolyte contains about 0.01 to 0.5 percent by weight colloidal silica (dry basis), from about 0.5 to 30 percent sodium sulfate which increases the electroconductivity of the anolyte. Furthermore, the anolyte will have a pH ranging from about 2 to 12.

The cathode compartment 11 contains a catholyte solution which comprises dilute sodium hydroxide solution which contains from about 0.1 to 40 percent by weight NaOH. Subsequent to filling the anode compartment 10 and cathode compartment 11, a source of DC power (not shown) is applied to the anode and cathode. Typically, the voltage will range from about 2.5 to 10 volts and the current density will range from about 0.05 to 0.3 amps/cm$^2$. Preferably, the anolyte is constantly agitated during electrodialysis to prevent the formation of silica gel which may deposit on the anode 2.

During operation of the cell, as indicated in FIG. 1, sodium ions from the anolyte migrate through the membrane 4 to the cathode compartment 11. Sodium silicate is preferably added to the anolyte at the same rate sodium ions are removed to the catholyte to maintain a near-constant sodium ion concentration (pH) in the anolyte. Simultaneously, oxygen is liberated at the anode 2 and hydrogen at the cathode 3. As the electrodialysis proceeds, dialytic silica precipitates in the anode compartment and may be conveniently removed as precipitated dialytic silica slurry. Furthermore, as the concentration of sodium hydroxide in the cathode compartment increases, catholyte solution is removed to maintain the desired level of sodium hydroxide in the catholyte.

The construction of the electrodialysis cell shown in FIG. 1 utilizes materials which are resistant to the effects of caustic solution. Typically, the cell container is constructed of glass, plastic or stainless steel. The anode 2 comprises titanium, zirconium, niobium or hafium coated platinum group metals and are commercially available as Dimensionally Stable Anodes. The cation selective membrane 4 is preferably constructed of a polymer containing copolymerized sulfonated styrene or unsaturated carboxylic acid. Suitable commercially available membranes are described as sulfonic or carboxylic acid type membranes, such as Nafion. The cathode may be constructed of iron, steel, stainless steel or nickel. The spacing of the anode and cathode is preferably such that the space is minimized at preferably from about 1 to 5 mm. Typically, commercially available electrodialysis membranes which incorporate a built-in anode and cathode surface such as is available from General Electric may be utilized in the construction of the cells contemplated herein. While the Figure describes a cell which is rectangular in shape, it is contemplated that the cell and the included cathode and anode and cation selective membrane structure may be of cylindrical configuration.

The alkali metal silicate component, preferably sodium silicate, may be obtained from several commercial sources, and typically comprises an aqueous solution of water glass which has the formula 1 to 3.3 Na$_2$O.SiO$_2$.

The finely divided silica seed component which promotes the formation of precipitated silica, has a particle size ranging typically from 1 to 30 millimicrons. The seed may be obtained from recycle anolyte or as commercially available silica sol. Furthermore, silica seeds may be prepared in the anolyte chamber (self seeding) by electrodialysis of sodium silicate under conditions which produce silica-sol, i.e. voltages of 2.5 to 10 v and current densities of 0.05 to 0.3 amps/cm$^2$. Alternatively, the seed may be prepared in the form of finely dispersed silica-alumina micells. In one preferred practice of the invention the seeds are prepared by combining sodium silicate, sodium aluminate and water in the following ratios:

| Sodium Silicate | Sodium Aluminate | Water |
| --- | --- | --- |
| 10 | | 100 to 11,000 |
| 1 | 10 | 100 to 11,000 | and subsequently reacting the mixture at a temperature of about 5° to about 100° C. for a period of 0.5 to 10 hours.

In preparing the initial seed containing anolyte a seed suspension is added to the anolyte mixture in amounts that provide from about 0.5 to 2.0 percent by weight seeds (dry basis) in the anolyte composition. The seed containing anolyte is thus held (aged) for a period of about 0.5 to 12 hours at a temperature of 20° to 80° C.

The particulate dialytic silica which is removed from the anode compartment 10 of the cell shown in FIG. 1 as an aqueous slurry, typically contains from about 4 to 16 percent by weight SiO$_2$ (dry basis). The dialytic silica product has a dried particle size which will range from about 0.1 to 100 microns, and may be washed with water to remove soluble impurities such as sodium hydroxide, sodium sulfate/nitrate or the acids of these salts. The dialytic silica product which contains typically less than about 1.0 percent by weight Na$_2$O, may be utilized for a wide variety of purposes, including the preparation of catalysts, adsorbents, fillers and abrasives.

Figure 2:
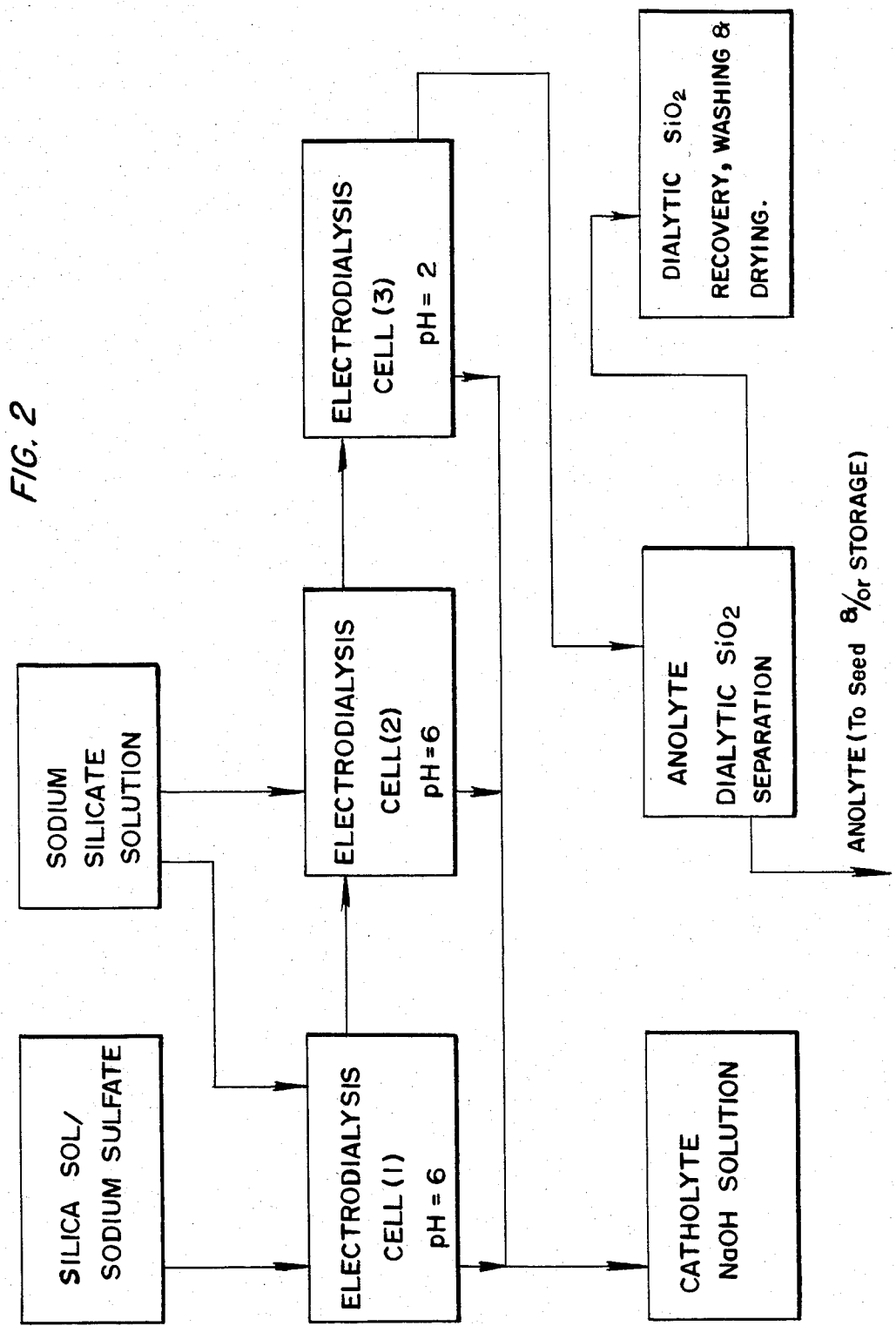
FIG. 2 is a flow diagram of a continuous electrodialysis process for preparing precipitated silica which is a preferred method for practicing the invention.

In a proposed preferred commercial practice of the invention, a process scheme such as shown in FIG. 2 may be utilized. As shown in the flow diagram of FIG. 2, three (or more) electrodialysis cells are connected in series. Electrodialysis cell No. 1 is connected to a source of seed slurry (typically silica sol) containing 0.1 to 1.0 percent SiO$_2$ and from about 1 to 20 percent by weight of a salt (such as sodium sulfate/nitrate) as well as a source of sodium silicate solution. The electrodialysis starts in cell No. 1, wherein an anolyte is produced which contains up to about 6 percent by weight precipitated silica dialytic product. The electrodialysis conditions for cell No. 1, as well as 2 and 3, are such that the pH will range from about 3 to about 9.5, the voltage will be from 2.5 to 10 v, and the current density from about 0.05 to 0.3 amps/cm$^2$. During electrodialysis a catholyte is produced which contains sodium hydroxide in amounts ranging from about 5 to 40 percent by weight NaOH. As shown in FIG. 2, the catholyte from cell No. 1 along with the catholyte produced in cells 2 and 3, are collected for subsequent use.

As described in FIG. 2, the anolyte from cell No. 1 is then conducted to the anode compartment of cell No. 2 and mixed with additional sodium silicate solution. In cell No. 2 the anolyte is continuously removed and comprises a dialytic silica slurry which contains from about 3 to 12 parts by weight SiO$_2$. Also, as indicated previously, the sodium hydroxide containing catholyte is continuously removed and collected.

In the third cell of the series, the anolyte of cell No. 2 is combined with additional sodium silicate in the anode chamber where additional dialysis produces a dialytic silica slurry having an SiO$_2$ content of from about 4 to 16 percent by weight.

While three cells are connected in series in FIG. 2, it is to be understood that the process may be conducted using additional cells. It is contemplated that as many as up to 50 cells may be interconnected to obtain the desired result. The final anolyte from cell No. 3, which contains dialytic silica, is then subjected to a separation process, typically settling/decantation and/or centrifuging and filtration to obtain a dialytic silica filter cake which is subsequently washed and dried to a desired soda and moisture level.

The dried dialytic silica typically has a particle size range of 0.1 to 100 microns and an apparent bulk density (ABD) of 0.1 to 0.6 g/cc, a surface area (SA) of 10 to 500 m$^2$/g as determined by BET, a nitrogen pore volume (N$_2$PV) of 0.1 to 2.5 cc/g in pores ranging from about 5 to about 600 A° in diameter, a total mercury pore volume (HgPV) of 1 to 6 cc/g in pores ranging from about 37 to about 10,000 A° in diameter.

As indicated in FIGS. 3 and 4 the novel dialytic silica of the present invention is characterized by a unique physical structure wherein an open structure is produced. This structure contains more internal pores and a high degree of particle integrity, hardness and grindability than conventional particulate precipitated silica products. It appears that the dialytic silica particles comprise silica micelles bound together by siloxane bonds rather than hydrogen bonds present in conventional precipitated silica particles.

A sample of conventional precipitated silica having a similar particle size is shown in FIGS. 5 and 6; It is noted that the structure of the conventional precipitated silica particles is considerably different from that of the novel dialytic silica shown in FIGS. 3 and 4 in that significantly less internal pore structure and resulting surface area is present.

I have also observed that the novel dialytic silica of the present invention possesses a unique pore volume distribution which is not found in conventional precipitated silicas. In particular, my dialytic silica contains less pore volume in pores smaller than 3000 A° in diameter and more pore volume in pores larger than 3000 A° in diameter (as determined by mercury porosimetry) than conventional precipitated silicas having a similar particle size range. As will be shown in data set forth in the subsequent examples, the ratio or pore volume, in pores greater than 3000 A° in diameter to pore volume in pores less than 3000 A° in diameter (expressed as $$\frac{PV > 3000A°}{PV < 3000A°}$$

for dialytic silica is greater than 1 and typically ranges from about 1.6 to about 3.5, whereas the $$\frac{PV > 3000A°}{PV < 3000A°}$$

for conventional precipitated silicas having similar total pore volumes typically range from about 0.4 to 1.

It is also noted that the novel dialytic silicas of my invention possess unique abrasion characteristics which may be due in large part to the unique physical structure illustrated in the photomicrograph of FIG. 3. While conventional precipitated silicas of the type shown in FIG. 4 become soft (less abrasive) as porosity (pore volume) increases, my dialytic silica remains quite abrasive at high porosities due to its increased structural integrity. In addition it is noted that dialytic silica exhibits a high degree of thickening efficiency when used as a thickening agent in liquid systems.

The anolyte liquid component which is separated from the dialytic silica by settling and decantation, centrifuging and/or filtration, contains minor quantities of sodium silicate as well as partially polymerized colloidal silica which may be recycled as a seed component or combined with additional sodium silicate solution. It is noted that the process set forth in FIG. 2 contemplates the production of dialytic silica wherein a minimum of waste effluent is produced. Concentrated sodium hydroxide catholite as well as the liquid anolyte filtrate and wash water are collected and recycled.

Having described the basic aspects of the present invention, the following examples are given to illustrate specific embodiments thereof.

EXAMPLE 1

(a) In each run a starting seed-containing anolyte was prepared by combining the following ingredients:

| Anolyte Seed Solution |
|---|
| 1,211 g (40° Baume) sodium silicate solution (28.7 wt. % SiO$_2$ 8.8 wt. % Na$_2$O) |
| 300 g sodium nitrate |
| 34,000 g water |
| 35,511 g total |

The anolyte at pH 10.9 and 46° C. was placed in the anode compartment of an electrolytic cell similar to that shown in FIG. 1. Six volts applied across the cell produced a current of 39 amperes. After 118 ampere-hrs. pH of the anolyte was 6.7 and the temperature was 50° C. The mixture was then aged one hour with no current applied. The resulting anolyte comprised a silica-sol seed composition which contained 1 percent by weight SiO$_2$.

(b) After one hour the current was turned on and the following anolyte feed solution was added slowly to the seed anolyte prepared in (a) above to maintain the pH of the anolyte at 6.

| Anolyte Feed Solution |
|---|
| 6055 g 40° Baume sodium silicate solution |
| 3027 g water |
| 9082 g total |

The feed solution contained 5 times as much by weight SiO$_2$ as the starting anolyte solution but was sufficiently diluted to prevent clogging at the end of the feed tube. Addition of the anolyte feed solution took four days and an electrical energy consumption of 808 ampere-hours, which maintained the pH at 6. The pH was then reduced to 2.67. The resulting slurry was filtered and washed with 20 liters deionized (DI) water and 60 liters pH 9 ammonium hydroxide solution, and dried overnight at 200° C. This dialytic silica has a surface area of 401 m$^2$/g and nitrogen pore volume of 1.32 ml/g. The properties of this sample (Sample 2) are set forth in Table I.

(c) Additional samples (1 and 3) were prepared by a similar technique using the seeding ratios shown in Table I. Sample 1 was completed in two days while Sample 3 took four days with a weekend occurring in the middle of the run. Aging overnight during the preparation of these samples may account for some variation in physical properties set forth in Table I.

TABLE I

| Dialytic Silica Properties | | | |
|---|---|---|---|
| Sample No. | 1 | 2 | 3 |
| Seed Ratio (wt. $SiO_2$ added to wt. $SiO_2$ seed) | 3/1 | 5/1 | 7/1 |
| Chemical Analyses | | | |
| Total volatiles (TV) @ 1750° F. (wt. %) | 5.89 | 6.02 | 4.22 |
| $Na_2O$ (wt. %) | 0.26 | 0.094 | 0.047 |
| $SO_4$ (wt. %) | 0.016 | 0.027 | 0.045 |
| N (wt. %) | 0.10 | 0.014 | 0.020 |
| pH (5 wt. % in $H_2O$) | 9.13 | 7.23 | 6.64 |
| Apparent Bulk Density (ABD) (g/cc) | 0.216 | 0.200 | 0.256 |
| Oil Absorption (parts by wt. oil/100 parts by wt. silica | 293 | 286 | 232 |
| Physical Properties | | | |
| Surface Areas ($m^2/g$) | 283 | 401 | 272 |
| Pore Volume ($N_2$, ml/g $\leq$ 600 A° Dia.) | 1.69 | 1.32 | 0.87 |
| Average Pore Diameter (A°) | 239 | 131 | 128 |
| Total $N_2$ Pore Volume (ml/g) | 2.17 | 2.14 | 1.82 |
| Dialysis Conditions | | | |
| Voltage (v.) | 6.0–6.9 | 6.0–7.25 | 6.0–7.3 |
| Current Density (amps/$cm^2$) | .043–.065 | .034–.055 | .035–.055 |
| Power Consumed (amp-hrs.) | 602 | 949 | 1,493 |
| Feed pH | 11.3 | 11.3 | 11.3 |
| Final pH | 2.90 | 2.67 | 3.02 |

EXAMPLE 2

Additional runs were conducted at silica to seed ratios of 5/1, 7/1 and 10/1.

(a) In all runs the initial seed concentration in the anolyte was 0.8 percent $SiO_2$.

| Anolyte Seed Solution |
|---|
| 943 g 40° Baume sodium silicate solution (38% by wt. $Na_2O \cdot SiO_2$) |
| 500 g sodium nitrate |
| 34,000 water |
| 35,433 g total |

The pH of the anolyte seed solution was reduced from 10.2 to 7.1 at 70° C. by applying a voltage of 5 volts for 111 ampere hours. The resulting silica-sol seed preparation was aged at room temperature for 2 hours. The following anolyte feed solution was added slowly, maintaining the pH between 7.6 and 8.5.

| Anolyte Feed Solution |
|---|
| 4715 g 40° Baume sodium silicate solution |
| 2360 g water |
| 7075 g total |

The voltage, current density, total power consumed, as well as the anolyte pH, maintained during addition of the feed solutions and final pH of the anolyte for each run is set forth in Table II along with chemical and physical properties of the product.

TABLE II

| Dialytic Silica Properties | | | |
|---|---|---|---|
| Sample No. | 4 | 5 | 6 |
| Seed Ratio (wt. $SiO_2$ feed to wt. SiO) | 5/1 | 7/1 | 10/1 |
| Chemical Analyses | | | |
| TV @ 1750° F., % | 5.11 | 4.52 | 4.55 |
| $Na_2O$ (wt. %) | 0.87 | 0.16 | 0.22 |
| $SO_4$ (wt. %) | 0.10 | 0.31 | 0.50 |
| $Al_2O_3$ (wt. %) | 0.12 | 0.10 | — |
| $N_2$ (wt. %) | 0.37 | — | — |
| pH (5% in water) | 4.24 | 4.30 | 4.16 |
| ABD (Apparent Bulk Density) | .08 | .20 | .70 |
| Oil Adsorption (g oil/100 g silica) | 316 | 279 | 113 |
| Physical Properties | | | |
| Surface Area, ($m^2/g$) | 215 | 67 | — |
| Pore Volume - ($N_2$, ml/g) | 0.95 | 1.84 | — |
| Pore Diameter, (A°) | 78 | 201 | — |
| Pore Volume, Total (ml/g) | 2.79 | 1.63 | — |
| Dialysis Conditions | | | |
| pH | 7.1–8.5 | 7.4–9.0 | 9–8.6 |
| Voltage (v) | 5.0–6.5 | 3.7–10.1 | 3.0–7.0 |
| Current Density (amps/$cm^2$) | .058 | .081 | .055 |
| Power Consumed (amps-hrs) | 702 | — | 564 |

EXAMPLE 3

The result of eight runs (Samples 7 to 14) are shown in Table III. In these preparations three variables were studied at three levels:

Salt ($Na_2SO_4$) content—50, 100, 200 g
Seed (Ludox)—25, 50, 100 g
Sodium silicate solution—1, 2, 3 kg
(40° Baumé)

Sodium sulfate (anhydrous), seed (commercial silica-sol Ludox 40% $SiO_2$) and deionized water were mixed to prepare four liters of anolyte. The anolyte was aged overnight at room temperature before electrolysis started. Sodium silicate was added to the hot (90° C.) stirred anolyte. pH's were not fully controlled, but generally were in the 9.0–10.4 range. After all the sodium silicate was added electrolysis continued until the pH was below 2.0. The slurry resulting was filtered, washed with eight liters of pH 9.5 ammonium hydroxide solution and three liters of deionized water, reslurried and spray dried. After spray drying, the samples were held in an oven overnight at 200° C.

When the seed is left out of this procedure (Sample 15), the anolyte gels after part of the sodium silicate is added and the gelled anolyte is difficult to remove from the electrolytic cell. High concentrations of the salt, or acid, and agitation, appear to reduce silica gelation on the anode. As shown in the data set forth in Table III the ratio of silica from sodium silicate (feed) to silica from seed is important in controlling physical properties, as also is pH and temperature of the anolyte, concentration of sodium silicate solution, and addition rate. It was noted that silica forms on the anode when the anolyte pH reaches about 10.7.

TABLE III

| | Properties, Conditions | | | | | | | | |
|---|---|---|---|---|---|---|---|---|---|
| Sample No. | 7 | 8 | 9 | 10 | 11 | 12 | 13 | 14 | 15 |
| Total Volatiles (wt. %) | 4.61 | 4.65 | 4.51 | 2.29 | 2.92 | 2.43 | 2.79 | 2.85 | gel |
| $Na_2O$ (wt. %) | .025 | .090 | .069 | 0.081 | 0.045 | 0.070 | 0.038 | 0.027 | — |
| $SO_4$ (wt. %) | .25 | .12 | .22 | 0.097 | 0.10 | 0.10 | 0.072 | 0.12 | — |
| pH | 5.49 | 6.54 | 6.04 | 5.60 | 4.42 | 5.37 | 5.38 | 5.06 | — |
| Apparent Bulk Density (g/cc) | .11 | .12 | .11 | .16 | .28 | .24 | .40 | .76 | — |
| Oil Adsorption (g oil/100 g silica) | 282 | 172 | 258 | 171 | 146 | 172 | 97 | 56 | — |

TABLE III-continued

| Sample No. | Properties, Conditions | | | | | | | | |
|---|---|---|---|---|---|---|---|---|---|
| | 7 | 8 | 9 | 10 | 11 | 12 | 13 | 14 | 15 |
| Surface Area (m²/g) | 195 | 54 | 152 | 93 | 49 | 23 | 11 | 8 | — |
| Pore Volume - H$_2$O cc/g | 1.22 | .76 | 1.04 | .92 | .62 | .44 | .34 | .44 | — |
| Pore Volume - N$_2$ cc/g | .38 | .08 | .34 | .18 | .18 | .04 | .02 | .03 | — |
| $\frac{\text{Silica wt. \%} - \text{Silicate Feed}}{\text{Silica wt. \%} - \text{Seed}}$ Ratio | 28.9 | 28.9 | 7.23 | 28.9 | 28.9 | 21.7 | 86.7 | 21.7 | — |
| Seeds (g SiO$_2$ in sol) | 25 | 100 | 25 | 50 | 100 | 50 | 25 | 100 | none |
| Na$_2$SO$_4$ (g) | 50 | 100 | 200 | 50 | 50 | 200 | 100 | 200 | — |
| Sodium Silicate (Kg) | 1 | 1 | 1 | 2 | 3 | 2 | 3 | 3 | — |
| Dialysis Conditions: | | | | | | | | | |
| Power Consumed (amp-hrs.) | — | 239 | 157 | 228 | 253 | 321 | 298 | 392 | — |
| Feed (pH) | 13 | 13 | 13 | 13 | 13 | 13 | 13 | 13 | — |
| Final (pH) | 2.2 | 1.65 | 1.92 | 1.90 | 1.64 | 2.10 | 1.74 | 1.37 | — |

EXAMPLE 4

A series of 13 particulate dialytic silica samples was prepared using the following general procedure:

(a) A seed mixture was prepared by combining either 80 gal. of decantate obtained from a previous batch (Samples 3–7 and 9–13) or dialytic sodium silicate solution (Samples 1, 2 and 8) with a salt (sodium sulfate or sodium nitrate) in amounts to obtain a salt concentration of 0.5 molar. Sodium silicate solution (40° Bé) was added to provide up to 1.2 weight percent SiO$_2$ from sodium silicate along with sufficient water to obtain 120 gal. of seed mixture. The mixture was heated to 60° to 80° C. and subjected to electrolysis in an apparatus similar to that shown in FIG. 1 to reduce the pH of the mixture from about 11 down to 3 to 6. The seed mixture was then aged for a period of up to 1 hour.

(b) To obtain an anolyte reaction mixture, sodium silicate solution (32° Bé) was added to the seed mixture to increase the pH up to 8 to 9. Electrolysis of the resulting anolyte mixture was performed at a voltage of 5–7 v and at a current of 400–500 amperes while continuously adding sufficient sodium silicate solution (32° Bé) to maintain a pH of 8 to 9. Electrolysis/sodium silicate addition/particulate dialytic silica formation was continued until the ratio of silica added during electrolysis of the anolyte reaction mixture was 3 to 8 times the amount of silica added during formation of the seed mixture in step (a) above. Addition of silicate solution was terminated and electrolysis was continued until the pH of the anolyte reaction mixture was lowered to a range of 3 to 7. The batch was permitted to settle for 12 to 24 hours. The upper layer was decanted and in some instances recycled to another batch. The bottom layer which contained the particulate dialytic silica product was reslurried with water, filtered, washed and dried to obtain the samples described in Table IV. The specific reaction conditions are also summarized in Table IV.

TABLE IV

| Sample No. | 1 | 2 | 3 | 4 | 5 | 6 | 7 | 8 | 9 | 10 | 11 | 12 | 13 |
|---|---|---|---|---|---|---|---|---|---|---|---|---|---|
| (a) Seed Mixture | | | | | | | | | | | | | |
| % SiO$_2$ from Silicate Soln. | 0.9 | 1.2 | 0 | 0.75 | 0.75 | 1.0 | 0 | 1 | 1 | 1 | 1 | 1 | 1 |
| Temp (°C.) | 60 | 50 | 80 | 65 | 60 | 62 | 63 | 70 | 70 | 70 | 70 | 60 | 80 |
| Initial pH | 4.5 | 6.0 | 9 | 9 | 9 | 3.25 | 5 | 3 | 3 | 3 | 3 | 3 | 6 |
| Aging (hr.) | 2 | 1 | 0.5 | 0.5 | 0.5 | 0 | 1 | 0.5 | 0.5 | 0.5 | 0.5 | 0.5 | 2 |
| Final pH | 8 | 6 | 9 | 9 | 9 | 9 | 9 | 8 | 6 | 9 | 9 | 6 | 9 |
| (b) Anolyte Reaction Mixture | | | | | | | | | | | | | |
| Reaction pH | 8 | 6 | 9 | 9 | 9 | 9 | 9 | 8 | 6 | 9 | 9 | 6 | 9 |
| Silicate Added wt. ratio SiO$_2$ | 5 | 5 | 115 | 4 | 4 | 4 | 4 | 4 | 5 | 5 | 3 | 3 | 5 |
| Final pH | 1.8 | 3.0 | 4.7 | 4.5 | 4.6 | 4.5 | 4.4 | 7.2 | 5.2 | 8.6 | 9 | 5.8 | 5.4 |
| Settling time (hrs.) | 0 | 0 | 0 | 0 | 3.5 | 19 | 17 | 12 | 7 | 17 | 19 | 22 | 18 |
| Physical Properties | | | | | | | | | | | | | |
| Surface Area (m²/g) | 215 | 398 | 39 | 20 | 41 | 109 | 88 | 96 | 55 | 39 | 96 | 94 | 107 |
| Pore Volume, N$_2$ (ml/g) | 0.95 | 2.09 | 0.02 | 0 | 10 | 0.39 | 0.29 | 0.19 | 0.05 | 0.14 | 0.13 | 0.24 | 0.13 |

EXAMPLE 5

The physical properties of dialytic silicas prepared in accordance with the method of Example 4 (Samples 3–8) of the present invention were compared to the physical properties of conventional commercially available particulate precipitate and fumed silica products. The physical property data is summarized in Table IV wherein ABD=average bulk density, g/cc; Cent. Density=centrifuge density, g/cc; Oil Ads=Oil Adsorption, g/100 g as determined with linseed oil; Surface Area=m²/g as determined by BET; Total Pore Volume=cc/g as determined by mercury porosimetry; Powder RDA=abrasion as determined by Radioactive Dentini abrasion; the pore volume distribution in pores above and below 3000 A° diameter as measured by mercury porosimetry and the ratios thereof.

TABLE V

| Sample No. (Exam. 4) | Type | ABD | Cent. Density | Oil Ads. | Surface Area (N$_2$) | Total Pore Volume (N$_2$) | Powder RDA | PV Hg <3000A° | PV Hg >3000A° | Ratio $\frac{>3,000}{<3,000}$ |
|---|---|---|---|---|---|---|---|---|---|---|
| 1 (3) | Dialytic | .399 | .769 | 56 | 39 | 0.93 | 1,639 | 0.34 | 0.59 | 1.74 |
| 2 (4) | " | .206 | 350 | 181 | 20 | 2.57 | 1,205 | 0.82 | 1.75 | 2.13 |
| 3 (5) | " | .275 | .332 | 232 | 41 | 3.49 | 681 | 1.07 | 2.42 | 2.26 |

TABLE V-continued

| Sample No. (Exam. 4) | Type | ABD | Cent. Density | Oil Ads. | Surface Area (N₂) | Total Pore Volume (N₂) | Powder RDA | PV Hg <3000A° | PV Hg >3000A° | Ratio >3,000/<3,000 |
|---|---|---|---|---|---|---|---|---|---|---|
| 4 (6) | " | .148 | .158 | 306 | 109 | 4.44 | 358 | .23 | 1.21 | 1.61 |
| 5 (7) | " | .147 | .166 | 274 | 82 | 4.48 | 353 | .01 | 1.47 | .44 |
| 6 (8) | " | .128 | .161 | 362 | 96 | 4.60 | — | 1.76 | 1.84 | .61 |
| 7 | " | .175 | .200 | 297 | 52 | 3.70 | — | 1.26 | 1.44 | .94 |
| 8 | Precipitated | .214 | — | 209 | 46 | 2.88 | 90 | .68 | 1.20 | 1.1 |
| 9 | " | .222 | — | 218 | 141 | 2.93 | 40 | 1.84 | 1.09 | .9 |
| 10 | " | .156 | .250 | 227 | 142 | 3.20 | 45 | 1.01 | 1.19 | .9 |
| 11 | " | .122 .135 .167 | .259 | — 223 | — 137 | — 3.32 | 40 | .45 | .87 | 1.9 |
| 12 | Fumed — | — | — | 320 | 253 | — | — | — | — | |
| 13 | Fumed — | — | — | 436 | 150 | 7.67 | — | 1.95 | 4.73 | .5 |
| 14 | Precipitated | — | — | 98 | 35 | 1.78 | 360 | .22 | .15 | .5 |
| 15 | — | — | — | 250 | — | 4.40 | 40 | 1.24 | 1.16 | .6 |
| 16 | — | — | — | — | 67 | 1.97 | 475 | .34 | .3 | .7 |
| 17 | — | — | — | 251 | — | 4.00 | — | 1.20 | .80 | .2 |
| 18 | — | .152 .176 | .263 .250 | 264 222 | — 179 | 3.08 | 40 | 1.04 | 1.04 | .1 |
| 19 | — | — | — | — | — | 3.86 | — | 1.38 | 1.48 | .2 |

From the above data it is noted that the dialytic silicas of the present invention possess a significantly greater $$\frac{PV > 3000}{PV < 3000}$$

than precipitated silicas of the prior art which have similar total pore volumes. The fumed silica Sample 13 (Cab-O-Sil M-5) possess a $$\frac{PV > 3000}{PV < 3000}$$

of 1.6; however, it is noted that the total pore volume (7.67 cc/g) is much greater than that of the dialytic silicas. Accordingly, it is indicated that the dialytic silicas of the present invention have unique pore volume distribution/surface area characteristics which distinguish the dialytic silica products over the commercially available precipitated and fumed particulate silicas.

The above examples clearly indicate that valuable silica products may be obtained using the teachings of the present invention.

I claim:

1. The process for preparing precipitated dialytic silica by electrodialysis which comprises:
   (a) preparing an aqueous anolyte which contains a salt, and silica-containing seeds having a particle size of below 100 millimicrons;
   (b) adding alkali metal silicate to the anolyte and subjecting said anolyte to electrodialysis to remove alkali metal ions at a pH of from about 5 to 10.5 and cause precipitation of silica; and
   (c) recovering precipitated dialytic silica from said anolyte.

2. The method of claim 1 wherein said alkali metal ions are collected as an alkali metal hydroxide-containing aqueous catholyte.

3. The method of claim 2 wherein silicate solution is added to said anolyte during electrodialysis at a rate which provides a substantially constant concentration of alkali metal ions in said anolyte.

4. The method of claim 1 wherein said anolyte is agitated to prevent deposition of silica on an anodic surface.

5. The method of claim 3 wherein the initial concentration of silica seeds in said anolyte is sufficient to provide 0.5 to 2.0 percent by weight colloidal silica in said anolyte and said seed containing anolyte is aged for a period of up to about 24 hours prior to addition of the silicate solution.

6. The method of claim 1 wherein said salt is selected from the group consisting of alkali metal sulfates, nitrates, phosphates and mixtures thereof.

7. The method of claim 1 wherein said salt is present in said anolyte in amounts ranging from about 0.3 to 20 percent by weight.

8. The method of claim 1 wherein said dialytic silica is dried to obtain particles having a size range of from about 0.1 to 100 microns.

9. The method of claim 1 wherein said silica containing seed is selected from the group consisting of silica sol, silica-alumina sol, recycled silica containing anolyte, and seed produced in the starting anolyte.

10. The method of claim 1 wherein said electrodialysis is conducted continuously in a series of electrodialysis steps.

11. The method of claim 10 wherein the initial electrolysis step is conducted at a pH of from about 1 to 6 and the final electrodialysis step is conducted at a pH of from about 5 to 10.5.

12. The method of claim 2 wherein the alkali metal hydroxide containing catholyte is continuously collected during said electrodialysis steps.

13. The method of claim 10 wherein a seed containing anolyte is produced in the first electrodialysis step.

14. The method of claim 13 wherein said seed containing anolyte is held for a period of up to about 4 hours prior to the addition of silicate.

15. The method of claim 1 wherein said alkali metal silicate is sodium silicate.

* * * * *